United States Patent [19]

Anderson et al.

[11] Patent Number: 4,868,783
[45] Date of Patent: Sep. 19, 1989

[54] DYNAMIC PORT RECONFIGURATION

[75] Inventors: Gary D. Anderson, Saugerties, N.Y.; Gerald J. Hladik, Raleigh, N.C.; Lawrence G. Mosher, Rhinebeck, N.Y.; Raymond L. Ricci; Henry Yeh, both of Kingston, N.Y.

[73] Assignee: International Business Machines Corporation, Armonk, N.Y.

[21] Appl. No.: 62,794

[22] Filed: Jun. 15, 1987

[51] Int. Cl.$^4$ .............................................. G06F 3/00
[52] U.S. Cl. ................................ 364/900; 364/948.1; 364/949.4; 364/929
[58] Field of Search ... 364/200 MS File, 900 MS File

[56] References Cited

U.S. PATENT DOCUMENTS

| | | | |
|---|---|---|---|
| 4,075,693 | 2/1978 | Fox et al. | 364/200 |
| 4,145,751 | 3/1979 | Carlow et al. | 364/900 |
| 4,155,117 | 5/1979 | Mitchell et al. | 364/200 |
| 4,514,824 | 4/1985 | Loskorn et al. | 364/900 |
| 4,646,320 | 2/1987 | Krishnan | 364/900 X |
| 4,751,634 | 6/1988 | Burrus Jr. et al. | 364/200 |

Primary Examiner—Raulfe B. Zache
Assistant Examiner—Florin Munteanu Ramnic
Attorney, Agent, or Firm—Robert L. Troike; Joseph J. Connerton

[57] ABSTRACT

A system for interconnecting an intelligent controller to a plurality of terminal devices includes a software module, a microprocessor and a device adapter having a plurality of output ports. The system operates under the control of said software module. When the system is powered up, a status for the output ports is assumed and tested under control of a configuration register. If the test is successful, the terminal port remains in that state; if unsuccessful, the state of the terminal port is reversed. The system permits an exchange of operating modes in the terminal devices associated with one port without adversely affecting operation of the remaining ports in the system.

5 Claims, 3 Drawing Sheets

DYNAMIC PORT RECONFIGURATION

FIELD OF THE INVENTION

The present invention relates to a terminal controller system and more particularly to a method including software and apparatus for interconnecting a processor through a device adapter and a plurality of output ports to terminal devices operating in local and remote configurations.

DESCRIPTION OF THE PRIOR ART

Local or remote communication between an intelligent controller and a plurality of output devices such as display terminal connected in local or remote configurations terminals generally requires that all associated hardware be set in the same mode, local or remote. The same interconnect function can be provided by customization options, but control unit operations must be disrupted to change protocols. There are two ways in which devices may attach to a control unit, either through direct coax attachments to a local device or through a fan out box or terminal multiplexer (TMS) to a remote terminal device. Such attachments are designated local and remote protocols. For further description of the fan out box operation, reference is made to copending application Ser. No. 06/586,659 "Remote Fan Out Facility for Data Terminals" filed by Harry Cheselka et al Mar. 6, 1984 and assigned to the assignee of the instant invention.

As previously described, the coax connection is designated local and the fan out box connection designated remote. In the prior art, communication between devices can be provided only when all components of the hardware are in the same mode. Such hardware includes adapter logic, driver-receivers and possibly a terminal multiplexer. Since the local and remote protocols employ different computer languages for communication, a means must be provided to indicate to the adapter which ports are in which mode. Each time the system output configuration is changed, it may be necessary to terminate system operations while the system configuration is being modified.

SUMMARY OF THE INVENTION

The present invention provides a flexible approach to the above described interconnect problem in which the output ports can be operated in local or remote protocol. The system comprises a device adapter, a software module, a microprocessor and a plurality of output ports connected to local or remote terminals. The microcode is designed to power up the system with no indication of the protocol of attached devices. The microcode gives the user the ability to reconfigure protocols from local to remote or vice-versa without having to take down the entire system. With this capability, the user can add or delete terminal devices or multiplexers at will and is not required to be at the controller to make the change. Since the only requirement to change modes is to insert or delete a fan out box from the path between the device to the control unit, the change can be made at the fan out box location and does not affect operation with the remaining system ports.

Accordingly, a primary object of the present invention is to provide an improved interconnect system between a controller and a plurality of associated local or remote terminal devices.

Another object of the present invention is to provide an improved device adapter using microcode for controlling communication between a controller and a plurality of ports in connected direct or remote configuration without any initial customization.

The foregoing and other objects, features and advantages of the invention will be apparent from the more particular description of the preferred embodiment of the invention, as illustrated in the accompanying drawings.

DESCRIPTION OF PREFERRED EMBODIMENT

Figure 1:
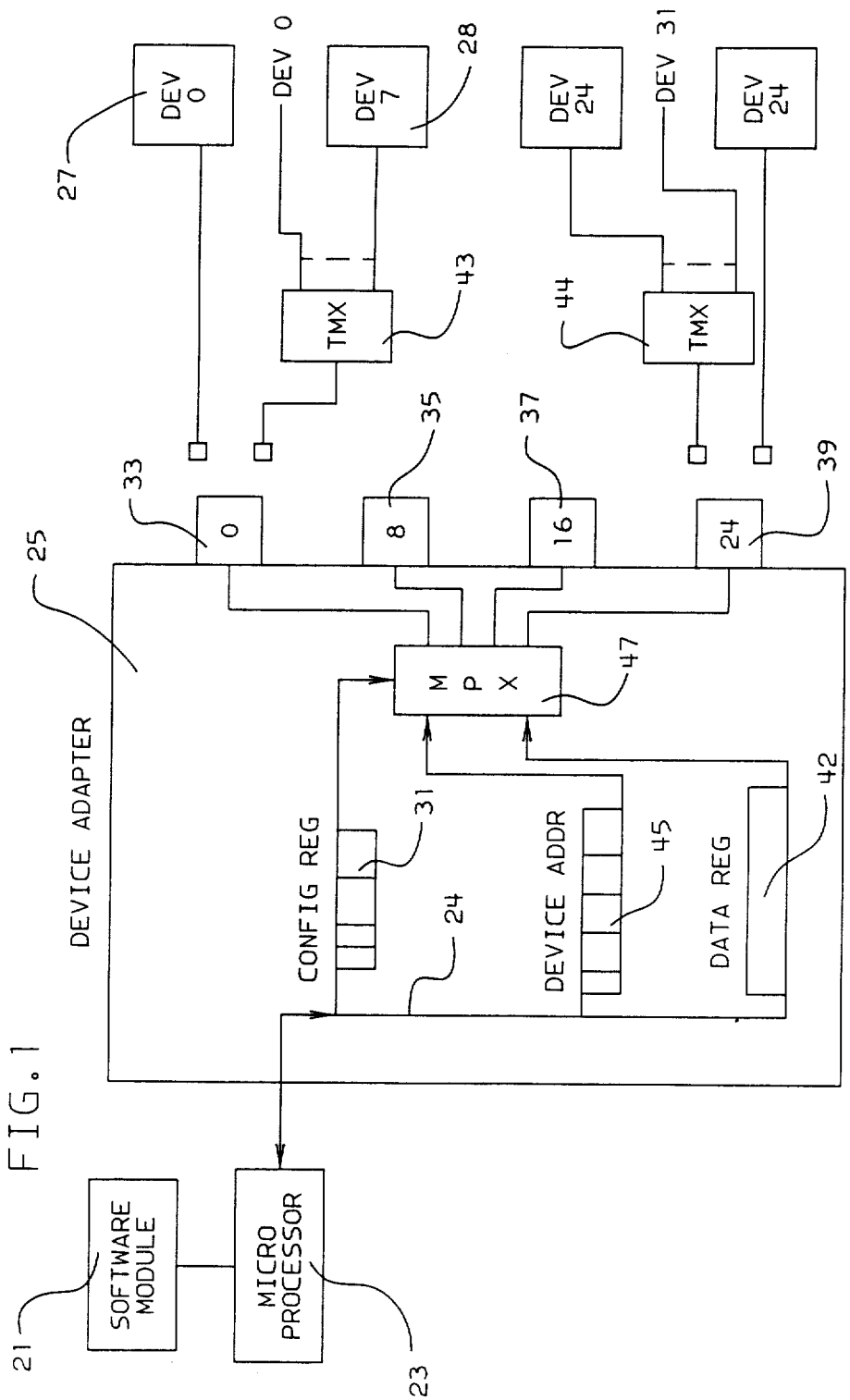
FIG. 1 is a block diagram of a system configuration of the instant invention.

Referring now to the drawings and more particularly to FIG. 1 thereof, the instant invention comprises a system configuration for interconnecting a controller to a plurality of output terminals. The system configuration comprises a software module 21, a microprocessor 23, a device adapter 25 and a plurality of associated terminal devices connected in local or remote configuration. The local devices such as device 27 are directly connected through a coax cable to one of the ports such as port 33, while the remote devices such as device 28 are connected through a terminal multiplexer to the same ports. It is obvious that each port can support only one of the connect methods at any given time. In the preferred embodiment of the invention, output ports 33, 35, 37 and 39 are labeled 0, 8, 16 and 24 respectively. Each output port can be in the "0" or "1" state, and can accommodate one local or 8 remote terminals respectively. However, all terminal devices connected to an output port must be of the same type, local or remote. Port 33 will handle devices 0–7, port 35 devices 8–15, port 37 devices 16–23 and port 39 devices 24–31, a total of 32 devices. The remote devices, as shown, are connected to the device adapter through associated multiplexers 43 and 44. Thus, each port can support up to 8 terminal devices, as described above.

When a system is to be brought on-line, i.e., power applied, all bits of the configuration register 31 are set in the "1" state. In the preferred embodiment of the invention, a four bit register is described by way of example. This configuration arbitrarily assumes that all four ports 33, 35, 37 and 39 are initially connected through terminal multiplexers to their associated remote devices, such as device 28. Until the microprocessor 23 initiates a new configuration command to the device adapter 25 which updates the configuration register 31, remote communication is maintained between the device adapter and the terminal multiplexer. Local terminal devices such as device 27 are connected to the output ports designated 0, 8, 16 and 24 each port having a single local terminal capability. Whenever a new configuration command is sent from the microprocessor to configuration register 31, the device adapter 25 will reconfigure the four ports to their respective direct or terminal multiplexer (TMX) terminals as designated by configuration register 31. For example, if port 33 is in the remote state, i.e. connected to terminal multiplexer (TMX) 43, the device adapter 25 will send out device 0 - device 7's data through port 33.

The software in software module 21 controls the device adapter configuration register 31 at all times except power on time. While conventionally, switching between direct multiplexer protocols is performed through mechanical switches for eight device terminals, as hereinafter described, the instant invention performs the same function under microcode control. This allows the operator to plug or unplug devices and multiplexers from their respective ports without disrupting sessions on the remaining ports in the system. In the instant invention, the microcode and software module 21 interfaces with a set of bits in a data register 43 in device adapter 25. Data register 43 is managed by microcode and controlled by the device attachment method, i.e., local or remote communication protocol. The address of the selected device in device address register 45 is provided by microprocessor 23 and the outputs of the three registers 31, 45 and 42 within the device adapter 25 are connected through multiplexer 47 to ports 33, 35, 37 and 39.

The implementation of the preferred embodiment of the invention uses four bits in configuration register 31, one bit per port, each of which bits, in turn, controls the operation of eight of the thirty-two device ports. The four bits then control the four external device adapter ports 33, 35, 37 and 39, and each bit is independently controlled so that a mixture of attachment methods on a single control unit is possible.

Again, since the current implementation in the preferred embodiment of the invention uses four bits, each port within a group of eight will have the same communication protocol. Because the communication protocol is under microcode control, it may be changed dynamically, which allows the terminal multiplexers to be plugged or unplugged without interruption of sessions on the remaining device adapter ports.

Thus, the basic concept during the power on sequence is to switch between communication protocols until successful communication is established. Once this occurs, no further action in this port is necessary until all devices in an attachment group are powered on, powered off and/or removed, thereby breaking the communication. As previously noted, a two communication protocol, direct or remote multiplexer, is used in the present invention, with an attachment group size of eight of the specified devices as described above. Thus, terminal multiplexers can be added or deleted at will and the user is not required at the controller to make the change. Since all that needs be done to change multiplexers is to insert or delete a fan-out box from the path of the device to the control unit, the change can be made at the fan out box location. This can provide a significant advantage, since the device location may be located at a considerable distance from the multiplexer.

Figure 2:
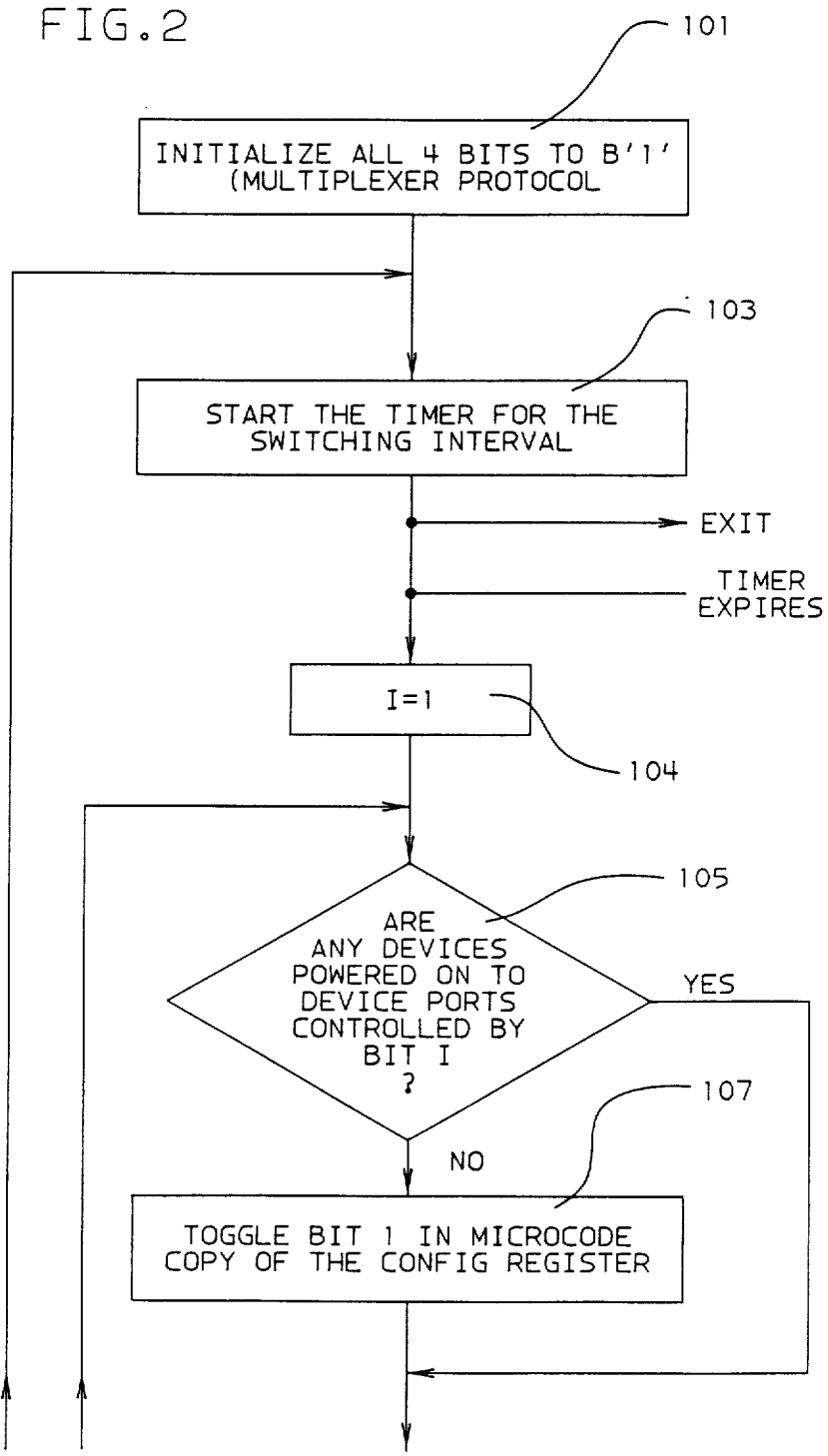
FIGS. 2 and 3 taken together comprise a flow diagram of the operation of the system illustrated in block form in FIG. 1.
Figure 3:
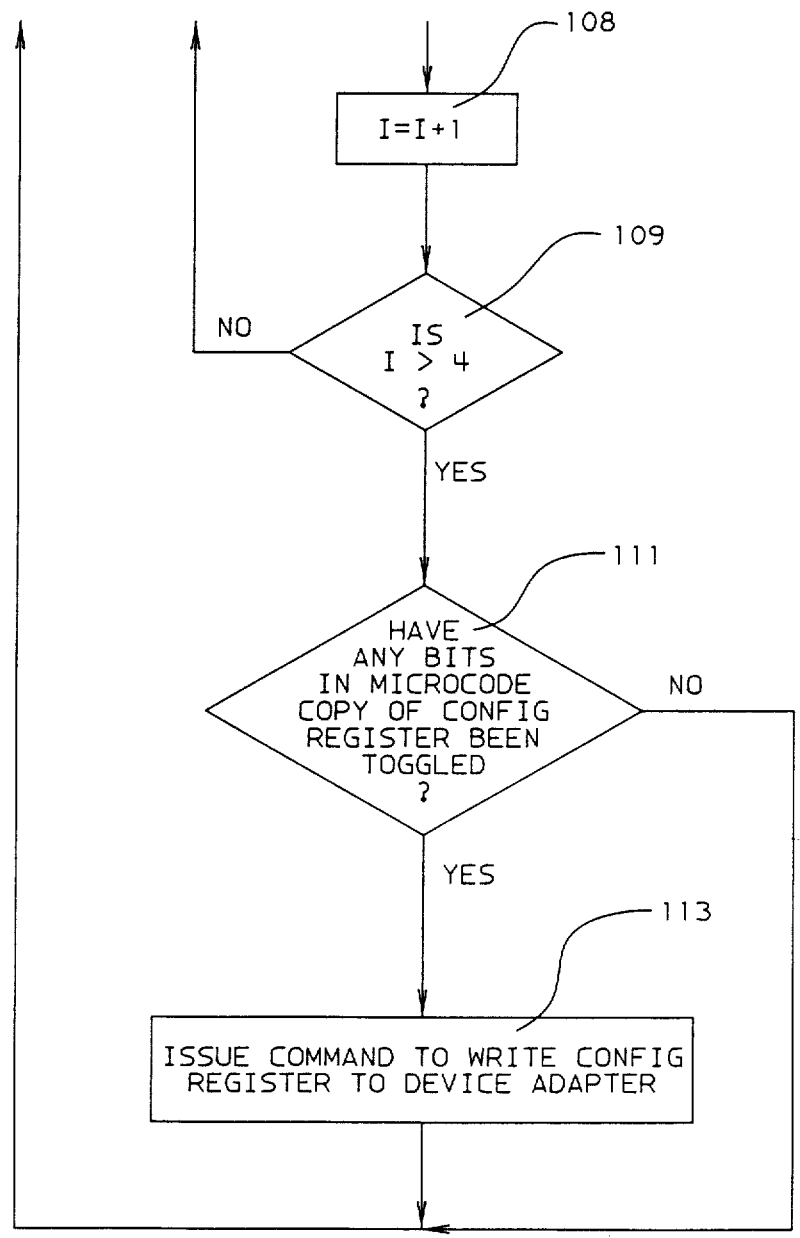

Referring now to FIGS. 2 and 3, there is illustrated a flow diagram of the operation of the software module and associated hardware illustrated in block form in FIG. 1. As previously described, when the instant invention is initially brought on line or powered up, the specific the output devices are operating in a direct or remote mode is not known. The sequence for determining the appropriate mode for each port operates as follows. Referring to FIGS. 2 and 3, the microcode in software module 21 interfaces to a set of bits within the configuration register 31 and device adapter 25 i.e. the microprocessor contains a matching register to configuration register 31, which is updated and modified to designate the operating mode of the terminal devices. These bits are managed by microcode and control the device attachment mode, direct or multiplexer coax communication protocol. The preferred embodiment of the invention utilizes four bits, each of which in turn controls the operation of eight of the 32 device supports. As previously described, configuration register 31 is assumed to have four bits, each bit associated with one of the four external device adapter ports 33, 35, 37 and 39. Each bit is controlled independently so that a mixture of terminal attachment methods from a single control unit is possible, but each port within a group of eight must have the same communication protocol. The specific communication protocol is under microcode control, and may be changed dynamically. This allows a user to plug or unplug terminal multiplexers without interruption of sessions on the other device adapter ports.

The algorithm which is used to determine the communication protocol bits introduced above operates as follows. The basic concept is to switch through the communication protocols for each port in sequence until successful communication is established. Once this occurs, no further switching is necessary until all devices in an attachment group are powered off and/or removed, thereby breaking the communication. As noted previously, the implementation of the instant invention uses two communication protocols, direct and multiplexer.

Returning to FIGS. 2 and 3, the drawings taken together, illustrate a flow chart of the operation of the instant invention. When the system is initially powered on, an initial sequence assumes remote terminal operation through a multiplexer, so the four bits of configuration register 31 are set in the "1" state, which identified TMX operation. This represents the initialization step indicated by block 101 for multiplexer protocol. The software module 21 as previously indicated, keeps a copy of the configuration register as it is modified during the power up sequence. When the four output ports have all been set in the "1" state, the software module 21 addresses each remote device in sequence through microprocessor 23, line 24 and system multiplexer 47. All connected devices so addressed will respond, and the response of any of the devices connected to an output port will automatically maintain the associated port in the "1" or remote state. If no response is obtained from any of the remote devices connected to a specific port, the state of the port is reset to "0", to designate local protocol. The interval allocated for initialization and response time is controlled by a timer under control of software. The flow diagram indicated start the timer (block 103) for the switching interval. During this time microprocessor 23 exits from the initialization routine to provide other functions associated with a terminal controller device.

When the timer expires, the routine continues with all ports set in the "1" state. A check is then made as to whether any terminal devices associated with port 33 have successfully initiated communications in the remote configuration under control bit 1 as indicated by decision block 105. If not, bit 1 is toggled reset in the microcode copy of the configuration register to "0" per block 107. If any remote devices associated with bit 1 are detected through port 33, port 33 remains set in the "1" state and the image of the configuration register maintained in the software module remains in the "1" state. As shown in FIG. 3, the test is then repeated for each of the output ports 35, 37, and 39 in sequence. The repetition is controlled by a loop counter incremented by block 108, and tested in 109. When all testing is complete, a check is made at decision block 111 to see if any of the bits have been toggled by block 107. If so then the final configuration will be specified in the matching register in the software module and thence transferred (indicated by block 113) to the configuration register 31 by a configuration command.

The flow diagram operates in terms of a single bit at a time from the configuration register and checks the protocol of ports 33, 35 37 and 39 in sequence. When the initialization is stored (block 113), an associated timer (block 103) under software control is started which allows a period sufficient for initialization and for the microprocessor to signal to the output ports of all of the remotely connected device terminals. The exit merely indicates that the microprocessor exits from the initialization routine to other tasks and returns when the timer expires. The inner loop (block 105, 107, 108 and 109) is executed for each of the bits from the configuration register. A copy of the configuration register is maintained in the software module and is modified in accordance with the testing sequence described, above. When all four ports have been tested, the four bits modified of the configuration register are transferred (block 113) from the software module to the configuration register 31 by means of a configuration command.

By means of the instant invention, a minimum amount of hardware is required so that the resultant package is compact. Hardware switches are eliminated, thereby reducing costs. Recustomizing, which requires the control unit operation be disrupted in order to change protocols, is eliminated and reduced maintenance costs is provided by avoiding control unit intervention when bypassing external terminal multiplexers which may be located up to one mile from the associated configuration register or their associated terminals. Because the communication protocol is under microcode control, it may be changed dynamically which allows the user to plug or unplug terminal multiplexers without interruption of sessions on the other device adapter ports.

While the present invention has been particularly shown and described with reference to a preferred embodiment thereof, it will be understood by those skilled in the art that various changes in form and detail may be made therein without departing from the spirit and the scope of the invention.

What is claimed is:

1. A system adapted to selectively interconnect a controller to a plurality of terminal devices connected in a local or remote configuration, where said local configuration refers to a direct connection of the devices to an output port and said remote connection refers to a connection via a terminal multiplexer, comprising, in combination:
   a device adapter having a plurality of controllable output ports and control means for said ports, said output ports being in either a local or remote configuration state;
   a plurality of terminal devices connected in either a local or remote configuration to said output ports; and
   means for determining whether the state of the output ports matches the way the devices are connected and if they do not match providing a signal to said device adapter changing the state of the output port.

2. A system of the type claimed in claim 1 wherein said terminal devices when switched from local to remote or vice-versa said determining means automatically matches the state of the ports without disrupting the remaining operations of said system.

3. A system of the type claimed in claim 1 wherein said control means includes a configuration register for controlling the states of said outputs ports.

4. A system of the type claimed in claim 3 wherein said determining means includes a software module and the contents of said configuration register is provided by said software module.

5. A method of providing a dynamic port configuration selectively interconnecting a controller to a plurality of terminal devices using an interconnect system including a device adapter having a plurality of exit ports, comprising the steps of:
   applying power to said system during start-up,
   setting a plurality of exit ports in said device adapter into a predetermined condition,
   testing the status of said condition for each of said plurality of exit ports,
   maintaining a binary register indicative of the status of said exit ports, and
   modifying said binary register in accordance with said testing procedure whereby for each bit one state designates local connection to the corresponding exit port and the other state designates remote connection to the corresponding exit port.

* * * * *